(No Model.)
C. H. & F. G. HEIMLICH.
PLOW POINT.
No. 504,727. Patented Sept. 12, 1893.
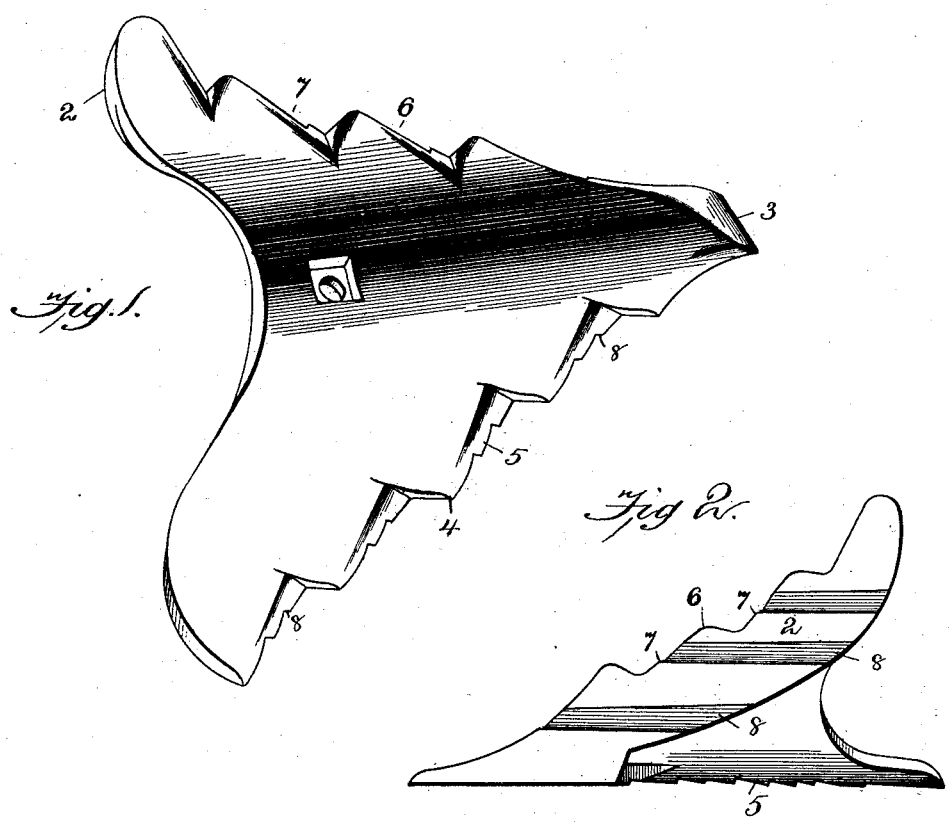
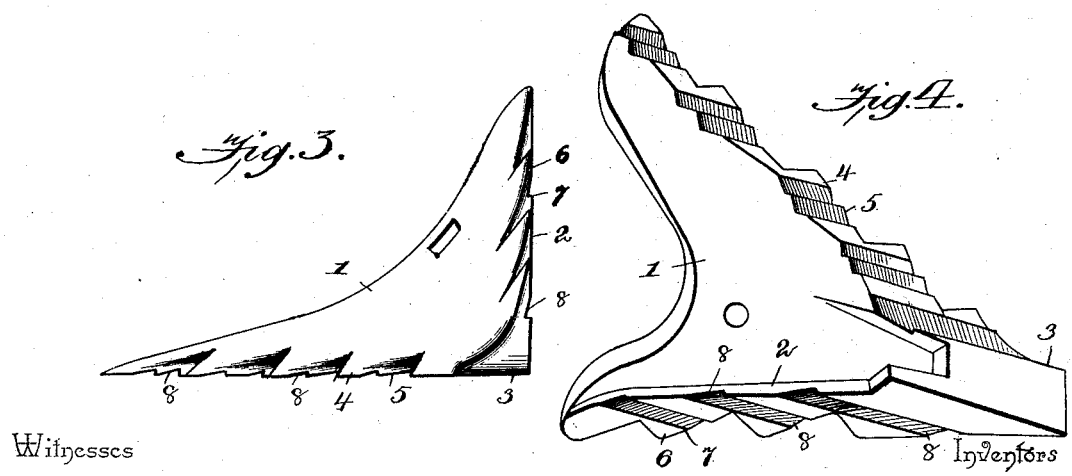
Witnesses
John C. Shaw
W. S. Duvall
By their Attorneys,
C. A. Snow & Co.
Inventors
C. H. Heimlich
and
F. G. Heimlich

UNITED STATES PATENT OFFICE.

CHARLES H. HEIMLICH AND FREDRICK G. HEIMLICH, OF VENICE, OHIO.

PLOW-POINT.

SPECIFICATION forming part of Letters Patent No. 504,727, dated September 12, 1893.

Application filed February 15, 1893. Serial No. 462,472. (No model.)

*To all whom it may concern:*

Be it known that we, CHARLES H. HEIMLICH and FREDRICK G. HEIMLICH, citizens of the United States, residing at Venice, in the county of Erie and State of Ohio, have invented a new and useful Plow-Point, of which the following is a specification.

Our invention relates to improvements in plow-points of that class in which one or both the edges of the point or the cutter are provided with a series of teeth.

Heretofore it has been common to provide one or both edges of the point and front cutter of plow-points with chisel-pointed teeth, the object of which was to enable the plow to more readily pass through and sever the roots of plants, &c. An objection to such a construction of plow-point resided in the fact that the abutting of the chisel-pointed teeth with such objects tended rather to impede the progress of the plow than to facilitate it, in that, the objects, which would in many instances slide to one side, by the inclined faces or edges of the plow-point, would necessarily be caught and severed, which of course would tend to increase to no small degree the draft, which is an object with all plow-makers to avoid. At the same time it is desirable to sever and destroy these roots, and we therefore propose by our invention to accomplish this desirable feature and yet at the same time to obviate the increased draft heretofore resulting from any attempt to construct a plow that was capable of effecting the desired results.

With these objects in view our invention consists in providing either one or both edges of the moldboard or the front cutter of the plow with a series of inclined teeth in contradistinction to the teeth heretofore employed which were not inclined, or in other words which did not have their cutting edges arranged at an oblique angle to the line of draft, but to the contrary, were arranged at a right angle.

The invention furthermore consists in producing upon the under side of the point and the landside of the cutter a series of grooves whereby the surface-contact between the under side of the point and the landside of the plow with the soil is decreased and hence the friction and draft reduced.

Our invention finally consists in so forming these grooves as to render them self-clearing, that is, obviate the clogging of the same by a collection of soil therein.

Referring to the drawings:—Figure 1 is a perspective view of a plow-point embodying our invention and of the preferred form. Fig. 2 is an elevation of the landside thereof. Fig. 3 is a front elevation. Fig. 4 is a bottom plan.

Like numerals of reference indicate like parts in all the figures of the drawings.

As usual, the plow-point consists of the moldboard side 1 and the landside 2, the two converging to form the reduced end or point 3. The front cutting edge of the plow is in this instance curved, but it will be obvious that the same may be straight or curved to any degree desirable and in accordance with the usual patterns of plows as the same are devised for the various uses.

The outer inclined edge of the landside is provided with a series of, in this instance, five teeth or serrations 4, the same being reduced at their outer inclined edges to form cutting edges 5, which, as will be seen, are arranged or disposed at an oblique angle to the line of draft, so that as the plow proceeds upon its travel any roots or other similar obstructions are deflected by the point and subsequently against the inclined cutting edges, whereby a shear-cut is produced upon the roots and the same are severed without obstructing or interfering to any practical extent with the progress of the plow. The front cutting edge of the plow is in this instance likewise provided with a series of teeth 6, the same being disposed obtusely to the line of draft and reduced to form cutting edges 7 in the same manner as those described as being formed in the edge of the point, and they act in the same manner upon such obstructions as roots that may lie in their path.

The under side of the point and the landside are each provided with a series of shallow grooves 8, the same being disposed directly in or parallel to the line of draft and having their bottoms inclined, as shown, or in other words, the grooves are decreased gradually in depth from their inner toward their outer edges so that they are self-clearing and cannot collect soil and hence become clogged. These grooves that are arranged upon the landside are located one opposite each tooth, and hence in a manner divide the cutting tooth into an upper and a lower portion so that when viewed in elevation the tooth has somewhat a serrated appearance. Upon the under side of the point of the plow, a pair, or it may be any number, of these grooves 8 are preferably formed, so that when viewed in plan the teeth have somewhat a serrated appearance, and hence, as will be obvious, each tooth in addition to its shear-like cut also produces a somewhat drag-saw cut and facilitates the severance of the roots. By a provision of the grooves it will be seen that the surface-contact of the plow with the soil is decreased to a material extent and hence the plow is adapted to run lighter than where the surface is smooth and unbroken. It will thus be seen that we have decreased the draft of the plow by two material changes; first, by a grooving of the sides of the plow that are exposed to the surface-contact; and, second, by a disposition given to the teeth, whereby the roots are not caught by said teeth, but are severed as the plow slides against the same in its travel.

Having described our invention, what we claim is—

1. The herein described plow-point having one of its cutting edges provided with a series of chisel-pointed teeth disposed at an obtuse angle to the line of draft, and the chisel-point of each tooth having a series of serrations, substantially as specified.

2. The herein described plow having one of its cutting-edges provided with a series of teeth having chisel-points, and opposite the same having channels disposed in the line of draft the cutting-edges of said teeth being disposed at an obtuse angle to the line of draft of the plow, substantially as specified.

3. The herein described improved plow-point, the same having its landside provided with a series of grooves arranged parallel to each other and to that of the draft, substantially as specified.

4. The herein described plow having the under side of its point provided with a series of grooves arranged in line with the draft, substantially as specified.

5. The herein described plow having one of its surfaces provided with a series of grooves disposed parallel to each other and to the line of draft of the plow and having inclined bottoms, substantially as specified.

6. The herein described plow, the same having one of its edges provided with a series of chisel-pointed teeth whose cutting-edges are arranged at an oblique angle to the line of draft of the plow, the under side of said plow being provided with grooves having inclined bottoms arranged opposite the teeth, substantially as specified.

7. The herein described plow, the front cutting-edge and moldboard cutting-edge of which are provided with a series of chisel-pointed teeth having cutting-edges disposed at an obtuse angle to the line of draft, the moldboard and under side of the plow being provided with a series of grooves whose bottoms are inclined and which intersect the cutting-edges of the teeth, substantially as specified.

In testimony that we claim the foregoing as our own we have hereto affixed our signatures in the presence of two witnesses.

CHARLES H. HEIMLICH.
FREDRICK G. HEIMLICH.

Witnesses:
THEO. RUH,
C. V. WAGNER.